(12) United States Patent
Guthmann et al.

(10) Patent No.: US 11,496,270 B2
(45) Date of Patent: Nov. 8, 2022

(54) CONTROL SIGNALING SIZE

(71) Applicant: Telefonaktiebolaget LM Ericsson (publ), Stockholm (SE)

(72) Inventors: Axel Guthmann, Nacka (SE); Robert Baldemair, Solna (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 16/614,500

(22) PCT Filed: May 3, 2018

(86) PCT No.: PCT/SE2018/050462
§ 371 (c)(1),
(2) Date: Nov. 18, 2019

(87) PCT Pub. No.: WO2018/222102
PCT Pub. Date: Dec. 6, 2018

(65) Prior Publication Data
US 2020/0099498 A1    Mar. 26, 2020

Related U.S. Application Data

(60) Provisional application No. 62/514,556, filed on Jun. 2, 2017.

(51) Int. Cl.
*H04W 4/00* (2018.01)
*H04L 5/00* (2006.01)
*H04W 72/04* (2009.01)

(52) U.S. Cl.
CPC ............ *H04L 5/0055* (2013.01); *H04L 5/001* (2013.01); *H04L 5/0039* (2013.01); *H04L 5/0098* (2013.01); *H04W 72/0413* (2013.01)

(58) Field of Classification Search
CPC ...... H04L 5/0055; H04L 5/001; H04L 5/0039; H04L 5/0098; H04L 1/1864; H04L 1/1822; H04L 1/1671; H04W 72/0413
USPC .......................................................... 370/329
See application file for complete search history.

(56) References Cited

U.S. PATENT DOCUMENTS

2018/0248669 A1* 8/2018 Takeda ................. H04L 5/001

FOREIGN PATENT DOCUMENTS

| CN | 102223219 A | 10/2011 |
|---|---|---|
| WO | 2011041623 A1 | 4/2011 |
| WO | 2013050449 A1 | 4/2013 |

(Continued)

OTHER PUBLICATIONS

NTT Docomo, Inc., "HARQ-ACK feedback for CA with up to 32 CCs", R1-154429, May 24-28, 2015. (From Applicant's IDS) (Year: 2015).*

(Continued)

*Primary Examiner* — Mang Hang Yeung
(74) *Attorney, Agent, or Firm* — Murphy, Bilak & Homiller, PLLC

(57) ABSTRACT

There is disclosed a method of operating a radio node (10) in a radio access network, the method comprising transmitting feedback signaling utilising a feedback resource range, wherein transmitting the feedback signaling comprises a transmitting a transmission size indication indicating a size of the feedback signaling. The disclosure also pertains to related devices and methods.

8 Claims, 3 Drawing Sheets

(56) References Cited

FOREIGN PATENT DOCUMENTS

WO      2016162791 A1    10/2016
WO      2017044066 A1     3/2017

OTHER PUBLICATIONS

"HARQ-ACK Feedback for CA with up to 32 CCs", 3GPP TSG RAN WG1 Meeting #82, R1-154429, NTT Docomo, Inc., Beijing, China, Aug. 24-28, 2015, 5 pages.

"HARQ-ACK Reporting for Aggregation of up to 32 Carriers", 3GPP TSG-RAN WG1 Meeting #81, R1-153081, InterDigital Communications, Fukuoka, Japan, May 25-29, 2015, 4 pages.

\* cited by examiner

CONTROL SIGNALING SIZE

TECHNICAL FIELD

This disclosure pertains to wireless communication technology, in particular in the context of feedback signaling in a radio access network (RAN).

BACKGROUND

In modern communication systems, feedback signaling is provide in a network for improved communication. Such feedback signaling may for example comprise measurement report signaling and/or acknowledgement signaling, e.g. in the context of acknowledgement processes. Based on feedback signaling, it may for example be determined whether data blocks have to be retransmitted (e.g., in the context of acknowledgement signaling processing), or which transmission mode/operational characteristics are suitable for reported channel conditions (e.g., in the context of measurement reporting). Feedback signaling is usually not provide as only transmission in a given transmission timing structure, but in parallel and/or multiplexed (e.g., time and/or frequency multiplexed) with other transmissions or signalings, e.g. data transmission and/or other control signaling. Moreover, feedback signaling may pertain to a plurality of different and changing processes, accordingly, it may be quite variable (e.g., in size) over time, for example between different occurrences and/or different transmission timing structures like slots or subframes.

SUMMARY

An object of this disclosure is to provide approaches allowing improved handling of feedback signaling, in particular in the context of radio access networks. The approaches may in particular enable reliable and predictable handling of feedback signaling, respectively corresponding signaling structures. The approaches are particularly advantageously implemented in a 5th Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution.

Accordingly, there is disclosed a method of operating a radio node (which may be referred to as transmitting radio node) in a radio access network. The method comprises transmitting feedback signaling utilising a feedback resource range, wherein transmitting the feedback signaling comprises transmitting a transmission size indication indicating a size of the feedback signaling.

Also, a radio node (e.g., referred to as transmitting radio node) for a radio access network is discussed. The radio node is adapted for transmitting feedback signaling utilising a feedback resource range, wherein transmitting feedback signaling comprises transmitting a transmission size indication indicating a size of the feedback signaling. The radio node may comprise, and/or be adapted for utilising, processing circuitry and/or radio circuitry, in particular a transmitter and/or transceiver, for such transmitting. Alternatively, or additionally, the radio node may comprise a transmitting module for such transmitting. It may be considered that the radio node comprises, and/or is adapted for utilising, processing circuitry and/or radio circuitry, in particular a receiver and/or transceiver, for receiving a configuration.

Moreover, there is disclosed a method of operating a radio node (which may be referred to as receiving radio node) in a radio access network. The method comprises receiving feedback signaling in a feedback resource range, wherein receiving the feedback signaling is based on a size of the feedback resource range determined based on a received transmission size indication. The method may comprise configuring a second radio node, e.g. a user equipment, from which the feedback signaling may be received, with a configuration.

In addition, a radio node (which may be referred to as receiving radio node) for a radio access network may be considered. The radio node is adapted for receiving feedback signaling in a feedback resource range, wherein receiving the feedback signaling is based on a size of the feedback resource range determined based on a received transmission size indication. The radio node may comprise, and/or be adapted for utilising, processing circuitry and/or radio circuitry, in particular a receiver and/or transceiver, for such receiving. Alternatively, or additionally, the radio node may comprise a receiving module for such transmitting. The radio node may in addition be adapted to configure a second radio node, e.g. a user equipment, from which the feedback signaling may be received, with a configuration, e.g. a configuration as described herein. The radio node may comprise, and/or be adapted for utilising, processing circuitry and/or radio circuitry, in particular a transmitter and/or transceiver, for such configuring. Alternatively, or additionally, the radio node may comprise a configuring module for such configuring.

Receiving feedback signaling may comprise determining the size of the feedback resource range based on the transmission size indication. Generally, receiving feedback signaling based on a size of the feedback resource range may comprise determining the feedback resource range, e.g. its location in time/frequency space and/or in the resource element grid of the transmission timing structure or structures it is transmitted in, and/or associating the resource/s or resource elements of the range with feedback signaling. In some variants, receiving feedback signaling may comprise receiving other signaling, e.g. data signaling or control signaling, and/or determining resources/resource ranges or structures or resource elements of a transmission timing structure or signaling resource range to be associated to, or utilised for, feedback signaling or other signaling based on the transmission size indication. For example, it may be determined that a certain amount of resources (e.g, resource elements) indicated by the size or transmission size indication in a resource structure or signaling resource range are associated to feedback signaling, and the rest to other signaling. Other signaling may in particular be (user) data signaling, or other kinds of control signaling, e.g. higher layer signaling. Such determining may also be based on a configuration and/or indication of the location or arrangement of the feedback resource range, e.g. relative to the resource structure or signaling resource range.

A transmitting radio node may in particular be a user equipment or terminal. A receiving radio node may in particular be implemented as network node or user equipment. The feedback signaling may in particular be uplink or sidelink signaling.

It may generally be considered that the feedback signaling comprises and/or represents acknowledgement signaling.

The transmission size indication may be represented by two or more bits.

It may be considered that the transmission size indication is included in the feedback signaling and/or in the feedback resource range. For example, the transmission size indication may be signaled or transmitted at a border symbol of the feedback resource range, e.g. at a starting or beginning symbol. However, in some variants, the transmission size indication may be provided in separate signaling, e.g. in an earlier (in time) transmission than transmission on the feedback resource range, and/or in a separate message than the feedback resource range.

The feedback signaling may be transmitted as Physical Uplink Shared Channel, PUSCH, signaling, or as Physical Uplink Control Channel, PUCCH, signaling.

In some variants, the transmission size indication may be transmitted based on a configuration. The configuration may indicate where, and/or when and/or whether to transmit the transmission size indication. It may be considered that the configuration indicates a threshold size of the feedback signaling, below which no transmission size indication is to be transmitted. A configuration may be signaled with control signaling, e.g. physical layer signaling, and/or DCI (Downlink Control Information) and/or MAC (Medium Access Control) and/or RRC (Radio Resource Control) signaling.

The transmission size indication may be based on, and/or indicate or represent, a size of acknowledgement signaling, in particular a number of bits of acknowledgement signaling. In particular, the transmission size indication may indicate the size of acknowledgement signaling. The feedback signaling may comprise, and/or comprise of, the acknowledgement signaling.

It may be considered that the feedback signaling neighbors PUSCH transmission in frequency, and/or is included in PUSCH transmission.

Generally, the feedback resource range may be a part of a signaling resource range configured to the user equipment or radio node for transmission.

A size of the feedback signaling may correspond to the size of the feedback resource range, and/or may be related thereto. It may be considered that the size of the feedback signaling represents a number of bits and/or a bit rate of the feedback signaling.

Moreover, a program product comprising instructions causing processing circuitry to control and/or perform a method as described herein is disclosed.

Also, there is discussed a carrier medium arrangement carrying and/or storing a program product as described herein.

Approaches described herein allow improved feedback signaling handling, in particular providing a receiving radio node with information regarding the size of feedback signaling. Accordingly, confusion between the radio nodes regarding transmission structures/resources associated to different channels may be avoided or limited, with limited signaling overhead. Advantageously, the transmission size indication may be provided to a radio node like a network node in uplink signaling, so that less downlink control signaling may be utilised, allowing improved control signaling flow in the downlink, which is usually to be prioritized as it is required for managing the radio access network.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
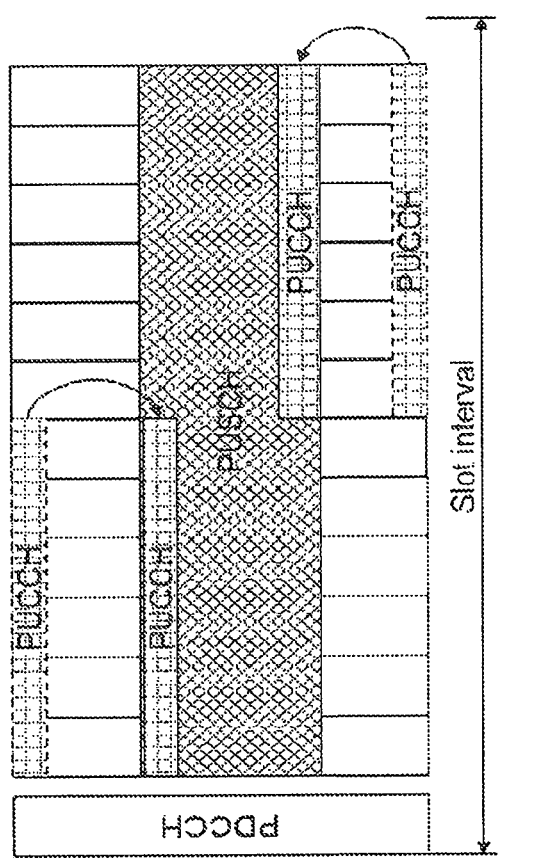
FIG. 1, showing a slot interval with PUSCH and PUCCH resource ranges.

A resource range may be considered a resource structure, which may be associated to, and/or arranged in, a (e.g., specific) transmission timing structure, e.g. a slot or PRB. Such a range may in particular be resource structure comprising one or more resource element, and/or cover a time interval and a frequency interval. The feedback resource range may be part of, and/or be included into, a signaling resource range.

Generally, a resource range may have an extension in time and/or frequency domain depending on a numerology, which may be configured and/or configurable.

A feedback resource range may be considered to comprise and/or represent and/or to be associated to and/or to be scheduled for feedback signaling or UCI comprising feedback signaling, e.g. on a specific channel like PUSCH or PUCCH. A signaling resource range may be considered a resource structure, in particular in time and frequency domain, which may comprise a plurality of resource elements. The signaling resource range may be larger than the feedback resource range. However, there may be considered solutions in which the feedback resource range is the signaling resource range, e.g. for UCI on PUCCH, in particular if UCI only comprises feedback signaling.

A signaling resource range may be configured to a radio node or UE. Such a configured signaling resource range may be considered a resource structure scheduled and/or indicated to the radio node for transmission by the radio node. Such a configured resource range may pertain to signaling on a specific channel or specific channels, e.g. PUSCH and/or PUCCH.

Generally, feedback signaling may be in response to received data transmission and/or reference signaling.

In some variants, resources reserved for PUSCH (UL data channel), e.g. a signaling resource range, respectively PUSCH signaling, may contain, e.g. at a fixed or predetermined, or configured, position (in time/frequency) a transmission size indication or indicator, that indicates how many resource elements (RE) are used for feedback signaling, in particular acknowledgement signaling like AN (or in general UCI). If the size of such signaling (e.g., UCI size) is large, this extra information (e.g. 3 bits→8 sizes) may be small relative to the signaling size. It may be considered that the receiving radio node like a gNB first decodes this size indication/indicator, and based on this decodes PUSCH and/or the feedback signaling or UCI.

Generally, the transmission size indication may be encoded/modulated, respectively decoded/demodulated, separately from the PUSCH and/or feedback signaling. This allows separate handling by the receiving radio node.

There may be generally considered a configuration indicating (e.g., with an inclusion indication) whether feedback signaling is to include a transmission size indication and/or is to be rate matched, e.g. configured with control signaling like DCI. For example, there may be considered a 1 bit indicator in DCI that indicates the size indication is to be transmitted, and/or that UCI is to be rate matched (which is especially useful for feedback/acknowledgement signaling with large sizes). Based on the configuration (in particular, the inclusion indication), e.g. if rate matching is indicated, the UE/transmitting radio node may insert a transmission size indication, e.g. a UCI size indicator, and transmit feedback signaling or UCI. This may be according to its received assignments and/or DAIs. UCI size could be zero, in this case at least a UCI size indicator could be included in the feedback signaling. If the smallest UCI size that can be indicated is >0, those >0 resources must be reserved or used for dummy bits/padding, but cannot be used for PUSCH. Corresponding rate matching with PUSCH may be performed. If rate matching is not indicated in DCI, the UE may omit the transmission indication size, e.g. puncture the acknowledgement signaling.

The feedback signaling may comprise and/or represent and/or consist of acknowledgement signaling. Acknowledgment signaling may pertain to one or more acknowledgement signaling processes and/or one or more data blocks. Such data blocks and/or associated signaling may be configured and/or scheduled for the radio node for reception, e.g. utilising corresponding control signaling, which may be represented by scheduling assignments.

Feedback signaling, in particular acknowledgement signaling, may pertain to one or more carriers, e.g. several carriers in a carrier aggregation (e.g. received carrier/s). The feedback signaling may be transmission in uplink, or sidelink, e.g. in response to data and/or reference signaling received or scheduled in downlink or sidelink. Acknowledgement signaling in response to received and/or scheduled data or corresponding signaling may be considered to be based on performing an acknowledgement determination and/or involve actions of an acknowledgement signaling process, e.g. error detection and/or correction and/or soft-combining. Measurement reporting signaling in response to received and/or scheduled reference signaling may comprise and/or be based on performing measurement/s and/or determining measurement information based on the reference signaling.

The transmission size indication may generally be represented by two or more bits, and/or a bit pattern comprising two or more bits. Signaling or a signaling format comprising and/or carrying the transmission size indication may comprise a corresponding bit field.

In some variants, the feedback signaling may include padding, e.g. a bit pattern indicating DRX/DTX or similar, e.g. to indicate missed scheduling assignments.

It may be considered that the transmission size indication pertains to a size of signaling pertaining to a plurality of different feedback processes, in particular to a plurality of acknowledgement signaling processes. Such processes respectively associated acknowledgement information may be represented by the feedback signaling, in particular acknowledgement signaling. The transmission size indication may pertain and/or indicate a size (e.g., in bits or resource elements) corresponding to a size required for transmitting acknowledgement information/signaling pertaining to a number of scheduled acknowledgement signaling processes, respectively associated data or scheduled transmissions, and/or associated scheduling assignments. For example, the transmission size indication may correspond to and/or represent the number of bits and/or resource elements associated to a number of associated acknowledgement signaling processes, e.g. transmitted or scheduled within or for a given time interval. The given time interval may comprise one or more transmission timing structures, and/or one or more slots respectively associated time intervals. Alternatively, or additionally, the transmission size indication may pertain to feedback signaling associated to and/or scheduled and/or expected in a specific transmission timing structure, e.g. slot interval or mini-slot, and/or associated to or scheduled for a specific channel or resource structure, in particular the feedback resource range.

The feedback signaling may be transmitted as Physical Uplink Shared Channel, PUSCH, signaling, or as Physical Uplink Control Channel, PUCCH, signaling. The signaling may utilise a resource structure associated to and/or scheduled for such a channel. In some variants, feedback signaling may comprise, and/or represent acknowledgment signaling, and/or measurement reporting signaling, and/or UCI signaling.

Scheduling a resource structure may comprise determining and/or indicating, in particular configuring, the resource structure for signaling or a transmission, e.g. in downlink, uplink or sidelink. Such indicating or configuring may comprise transmitting scheduling information and/or corresponding configuration data. Scheduling signaling/a transmission, respectively an associated resource structure, to be received by a scheduled or configured radio node (e.g., in downlink) may comprise transmitting or indicating one or more scheduling assignments, e.g. in one or more messages. Scheduling signaling/a transmission, respectively an associated resource structure, to be signaled/transmitted by a configured or scheduled radio node (e.g., in uplink) may comprise transmitting a signaling grant, e.g. an uplink or sidelink grant. A configuration may be configured accordingly.

If a radio node misses a scheduling assignment, it may not even know that it was supposed to know that it should provide corresponding feedback signaling, e.g. acknowledgment signaling or information. With the approaches herein, the radio node, e.g. UE, may indicate to the network/another radio node a size for the feedback signaling, and provide transmission on the feedback resource range and the signaling resource range in a correct structure or format. Otherwise, if the node receiving the feedback signaling and/or signaling corresponding to the signaling resource range has an expectation (e.g., based on the scheduling assignments) of a different size for the feedback signaling, it may receive or detect the signaling on the ranges wrongly. In particular, signaling on PUSCH or associated resources may be wrongly decoded if the size of feedback signaling carried on PUSCH is different than expected.

Receiving signaling, and/or on a resource range, may comprise decoding and/or demodulation. The receiving may be based on an assumption of signaling structure, e.g. format, and/or size, and/or signal and/or information distribution. If the assumption is not correct, signaling may be decoded wrongly, and the corresponding transmission may be considered lost, wasting resources.

Configuring the signaling resource range may comprise configuring it for transmission by the configured radio node.

It may be considered that the transmission size indication is based on (or determined, e.g. by the configuring radio node, based on) a scheduled size (and/or the size of scheduled) of acknowledgement signaling, in particular a scheduled number of bits. Scheduled acknowledgement signaling may be acknowledgment signaling indicated in scheduling assignment/s. It should be noted that scheduled size or scheduled signaling in this context may be considered from the scheduler's (e.g., radio node like network node) point of view. A configuration or schedule actually configured to a radio node may differ from an (intended) schedule or configuration, e.g. due to loss of signaling or information, e.g. lost or missed scheduling assignments.

The transmission size indication may pertain to a size of actual feedback transmission, or indicate a size larger than that, e.g. including padding.

It may be considered that the feedback signaling neighbors PUSCH transmission in frequency, and/or is included or multiplexed in PUSCH transmission. Such transmission may be on an associated resource structure, e.g. configured for PUSCH. Utilising such transmissions allows flexibility and resource-efficient use of resources for feedback signaling, however it may lead to confusion between the feedback signaling and the (proper) PUSCH signaling, e.g. (user) data transmission. The approaches described herein are particularly suited to avoid such issues in this context.

It may be considered that the feedback resource range is determined based on the transmission size indication. Additionally, the feedback resource range may be based on received and/or decoded scheduling assignments (which may configure or indicate feedback or acknowledgment signaling for the feedback resource range), and/or based on the number of acknowledgement signaling processes scheduled or associated for the range, e.g. by received scheduling assignment/s. Thus, the feedback resource range may have a size that in some variants is dependent on different messages or types of messages, e.g. a scheduling grant and one or more scheduling assignments. The grant may pertain to scheduling resources for transmission by the node receiving the grant, the assignments may indicate data and/or transmission to be received by the node. In some variants, it may be considered that the feedback resource range is (e.g., also) determined based on a configuration, e.g. a feedback configuration or measurement configuration. A measurement configuration may for example pertain to timing and/or rate and/or size of measurement reporting information or CSI to be included in the feedback signaling and/or to be signaling utilising the feedback resource range.

The radio node or UE transmitting the feedback signaling may determine the feedback resource range, and/or be adapted for such determining. It may be considered that the radio node or UE comprises, and/or is adapted for utilising, processing circuitry and/or radio circuitry, in particular a receiver and/or transceiver, for such determining, and/or associated reception of signaling. Alternatively, or additionally, the radio node or UE may comprise a corresponding determining module.

Feedback signaling may be considered a form or control signaling, e.g. uplink or sidelink control signaling, like UCI (Uplink Control Information) signaling or SCI (Sidelink Control Information) signaling.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a frequency resource range may represent a non-continuous pattern of resources. A signaling resource structure may be implemented analogously. The resource elements of a substructure may be scheduled for associated signaling. A feedback resource range may, e.g. on one or more resource elements thereof, comprise and/or be associated to feedback signaling, e.g. measurement reporting signaling and/or acknowledgement signaling. In some variants, it may comprise and/or be associated to additional signaling, e.g. control signaling and/or data signaling like user data signaling, e.g. on PUSCH. Different signalings in a feedback resource range may be distributed according to a pattern, which may be configured or configurable, e.g. with a scheduling grant or other control signaling.

A feedback resource range may be determined based on rate matching, e.g. if it is multiplexed on a PUSCH. In rate matching, bits or resources assigned to or scheduled for PUSCH may be replaced by bits associated to feedback signaling, e.g. acknowledgment signaling. It may be considered that a feedback resource range may be determined based on a configured reference resource element and/or a configured arrangement of resources in a transmission timing structure. A reference resource element or arrangement may indicate where the range is to be located in time/frequency space, e.g. within a resource element grid in a transmission timing structure. A reference resource element may indicate a border in time and/or frequency for the range. There may be more than one resource elements configured.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI), which may comprise acknowledgement signaling like HARQ feedback (ACK/NACK), and/or measurement information signaling, e.g. comprising Channel Quality Information (CQI), and/or Scheduling Request (SR). One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

An acknowledgement signaling process may be a process of transmitting and/or retransmitting data (e.g., in the form of data elements), based on acknowledgement signaling, e.g. acknowledgement feedback like HARQ or ARQ feedback. Acknowledgement signaling may comprise and/or represent acknowledgement information, which may represent an acknowledgment or non-acknowledgement, e.g. of correct reception of the corresponding data or data element, and optionally may represent an indication of non-reception. In particular, acknowledgment information may represent ARQ (Automatic Repeat request) and/or HARQ (Hybrid Automatic Repeat reQuest) feedback. Correct reception may include correct decoding/demodulation, e.g. according to an ARQ or HARQ process, for example based on error detection and/or forward error correction coding, which may be based on a data element being received. Correspondingly, incorrect reception (non-acknowledgement) may refer to detection of an error during decoding/demodulating. Non-reception may indicate non-reception of a data element and/or non-reception of an acknowledgement position indication indicating a mapping pertaining to the data element. Non-reception may for example be indicated by a DTX (Discontinuous Transmission) and/or a DRX (Discontinuous Reception) indication. It should be noted that there may be DTX/DRX on either side of a communication. The radio node determining and/or transmitting the acknowledgement signaling may not receive an expected data element, and indicate this in the acknowledgement signaling as DTX, allowing more finely grained acknowledgment information. On the other hand, the radio node receiving acknowledgment signaling may not receive an expected acknowledgement signal, and treat this as a DTX event. Both kinds of DTX may be treated separately, e.g. as DTX1 and DTX2 or according to a different scheme. A data element in the context of acknowledgement signaling may in particular represent a data block like a transport block or code block, which may be subject to an acknowledgement signaling process, and one or more transmissions in the context of such a process. An acknowledgement signaling process may have associated thereto a process identifier, e.g. a process number like a HARQ process number or identifier or an ARQ process number or identifier. Acknowledgement information associated to an acknowledgement signaling process may comprise a number of bits or a bit pattern, e.g. comprising 1 or 2 bits. The bit setting may represent ACK or NACK (e.g., 1 or 0, or 11 or 00), or in some variants include DRX/DTX or similar. An acknowledgment signaling process may be associated to a data stream and/or channel or data block, and/or to a transmission in the context of a data stream and/or channel, or transmission of a data element or data block. A buffer or memory may be associated to an acknowledgement signaling process. An acknowledgement signaling process, for example a HARQ process, may comprise soft-combining and/or forward error correction and/or error detection schemes.

Transmission associated to an acknowledgement signaling process, and/or the associated resources or resource structure, may be configured and/or scheduled, for example by a scheduling assignment. A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or a feedback resource range on which associated feedback signaling is to be transmitted. Different scheduling assignments may be associated to different acknowledgement signaling processes. It may generally be considered that one or more scheduling assignments are transmitted separately, e.g. in one or more different messages, or to be separated in time and/or frequency by at least one symbol time interval and/or subcarrier. In some variants, a message may comprise more than one scheduling assignment. It may even be considered that a scheduling grant is transmitted together with one or more scheduling assignments, e.g. in the same message and/or according to an associated message or signaling format. As such grants may cover a significant range of resources, receiving/decoding the scheduling assignments may still fail even if a grant is received/identified correctly.

It may generally be considered that the feedback resource range and/or the signaling resource range are arranged and/or scheduled and/or configured within one, e.g. the same, transmission timing structure, e.g. a slot or PRB or mini-slot.

In the following, concepts and approaches are described in the context of NR technology by way of example.

Operation of NR requires the transmission of various control information from the UE to the network. Examples of uplink control information (UCI) are hybrid-ARQ acknowledgements (acknowledgement signaling) and channel-state information (measurement reporting). The UCI can be transmitted on for example
 a separate control channel, PUCCH, occurring for example at the end of a slot or during a slot, and/or
 multiplexed with data and transmitted on PUSCH ("UCI on PUSCH").

Multiplexing of UCI and data can be provided in different ways, e.g. based on rate matching, i.e. to adjust the set of coded bits representing the data to "make room" for the UCI. The UE and network should have a common understanding of whether UCI is present or not, otherwise the network may not be able to decide the uplink data.

Inconsistency between the UE and network regarding UCI presence can occur due to a missed scheduling assignment, e.g. in a previous slot. In such a case, the network expects the UE to transmit an acknowledgement relating to the downlink data transmission but, since the UE did not receive the scheduling assignment in the earlier slot (or earlier in the same slot, in some applications), it will not include any hybrid-ARQ feedback.

The amount (size) of feedback information, in particular the amount of hybrid-ARQ acknowledgements, may vary from time to time. One reason for variations may be a varying number of downlink transmissions (across slots and/or carriers) to acknowledge in one uplink slot. Sometimes there is only a single transport block to acknowledge, sometimes there could be multiple transport blocks (several downlink slots, several carriers) or even multiple code block groups (a transport block consists of multiple code blocks and it has been agreed to have the possibility for per-code-block-group acknowledgements).

There is proposed allowing indication of multiple feedback signaling or UCI sizes or size ranges, e.g. no, small, medium, and large feedback signaling size/UCI. This may facilitate reduced uplink overhead and/or avoid downlink control signaling. To each such size classification, a size in resources and/or bits or bit rate may be associated, e.g. configured or configurably.

Providing information, e.g. included in feedback signaling or in related resource/s, about the amount of resources utilised for feedback signaling/UCI (represented by a transmission size indication) is proposed. A small number of bits, e.g. indicating no/small/medium/large or different sizes or size classes or ranges, could be sufficient in order not to increase the DCI overhead too much. However, direct indication with an index of parameter indicating a size out of a continuous range of sizes (e.g., integer) could be conceived for more precision with slightly larger overhead. The size/s associated to classes or ranges may be configured or configurable, e.g. based on higher layer control signaling, e.g. MAC or RRC signaling.

The network node or e/gNB may receive the feedback signaling/UCI based on the size information received with the transmission size indication. In case of hybrid-ARQ acknowledgements not requiring all the resources, the UE could pad the message to fill up the reserved resources, e.g. if one or more scheduling assignments have been missed and/or the UE provides acknowledgment information for a lower number of processes than expected according to the scheduling assignments transmitted by the network (representing a network node). Similarly, if the amount of hybrid-ARQ information to feed back is larger than the amount of resources reserved, the UE need to follow some predefined rule on how to compress the information, for example by grouping transmission together and reporting ACK only if all the members of the group are correctly received.

The amount of resources to use for UCI (size of the feedback signaling) could depend on the configuration, e.g. a measurement configuration. For example, if periodic CSI reports have been configured and a report is to be transmitted in the slot, the UE knows that "large" means more bits for UCI on PUSCH than "large" received in a slot with no periodic CSI reporting. The size information in the DCI could also be interpreted in combination with other information, e.g. if transmission of an aperiodic CSI report in this slot is configured, the size information should be interpreted differently than in absence of an aperiodic CSI being requested.

As indicated in FIG. 1, simultaneous transmission of PUSCH and PUCCH may be considered, such that PUCCH may be inside the scheduled PUSCH region and/or neighbor it in time and/or frequency space. FIG. 1 indicates how PUCCH is moved into the PUSCH region for illustration, as comparison to separate/non-simultaneous PUSCH and PUCCH. Also in this case, the e/gNB must be aware that UCI is included within the scheduled PUSCH region and on how many resources. The same approaches as outlined above also apply here.

FIG. 1 shows how, in case of simultaneous transmission of PUSCH and PUCCH, PUCCH resources are moved inside PUSCH for simultaneous transmission of PUSCH and PUCCH (the dashed PUCCH is not transmitted). The region of PUCCH may be considered to represent the feedback resource range, and the region of PUSCH may in this case be considered to represent a signaling resource range.

Figure 2:
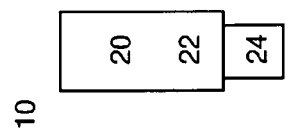
FIG. 2, showing an exemplary radio node, implemented as user equipment.

FIG. 2 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 3:
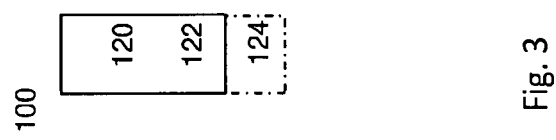
FIG. 3, showing an exemplary radio node, implemented as network node.

FIG. 3 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein.

The timing of a mini-slot may generally be configured or configurable, in particular by the network and/or a network node. The timing may be configurable to start and/or end at any symbol of the transmission timing structure, in particular one or more slots.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to (direct) transmission from on terminal to another. Uplink, downlink and sidelink (e.g., sidelink transmission and reception) may be considered communication directions.

Signaling may generally comprise one or more signals and/or one or more symbols. Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Transmitting signaling, in particular control signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol for transmitting or an ending symbol for receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1.

A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structured being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of or associated to a symbol. Accordingly, different symbols may have different symbol time lengths.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A mini-slot may be transmitted and/or received based on a configuration.

A configuration, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission and/or mini-slot may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation.

A configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

It may be considered that the scheduled transmission represents transmission on a physical channel, in particular a shared physical channel, for example a physical uplink shared channel or physical downlink shared channel. For such channels, semi-persistent configuring may be particularly suitable.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g.,in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component.

A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

| Abbreviation | Explanation |
| --- | --- |
| CDM | Code Division Multiplex |
| CQI | Channel Quality Information |
| CRC | Cyclic Redundancy Check |
| DCI | Downlink Control Information |
| DFT | Discrete Fourier Transform |
| DM-RS | Demodulation Reference Signal |
| FDM | Frequency Division Multiplex |
| HARQ | Hybrid Automatic Repeat Request |
| OFDM | Orthogonal Frequency Division Multiplex |
| PAPR | Peak to Average Power Ratio |
| PUCCH | Physical Uplink Control Channel |
| PRB | Physical Resource Block |
| RRC | Radio Resource Control |
| UCI | Uplink Control Information |
| UE | User Equipment |

Abbreviations may be considered to follow 3GPP usage if applicable.

The invention claimed is:

1. A method of operating a radio node in a radio access network, the method comprising:
    based on a configuration provided by the radio access network, determining the following for feedback signaling to be transmitted by the radio node: a feedback resource range, and whether the feedback signaling is to be rate matched;
    encoding and modulating the feedback signaling;
    when it is determined that the feedback signaling is not to be rate-matched, transmitting the encoded and modulated feedback signaling in the feedback resource range without an indication of a transmission size associated with the feedback signaling; and
    when it is determined that the feedback signaling is to be rate-matched:
        determining a transmission size associated with the feedback signaling;
        encoding and modulating an indication of the transmission size, wherein the indication of transmission size is encoded and/or modulated separately from the feedback signaling; and
        transmitting the encoding and modulated feedback signaling together with the encoded and modulated indication of the transmission size, in the feedback resource range.

2. The method of claim 1, wherein the feedback signaling comprises and/or represents acknowledgement signaling.

3. The method of claim 1, wherein the transmission size indication is represented by two or more bits.

4. The method of claim 1, wherein the feedback signaling is transmitted as Physical Uplink Shared Channel (PUSCH) signaling, or as Physical Uplink Control Channel PUCCH) signaling.

5. The method of claim 1, wherein the feedback signaling neighbors PUSCH transmission in frequency, and/or is included in PUSCH transmission.

6. A radio node for a radio access network, the radio node comprising radio circuitry and processing circuitry configured to:
    based on a configuration provided by the radio access network, determine the following for feedback signaling to be transmitted by the radio node: a feedback resource range, and whether the feedback signaling is to be rate matched;
    encode and modulate the feedback signaling;
    when it is determined that the feedback signaling is not to be rate-matched, transmit the encoded and modulated feedback signaling in the feedback resource range without an indication of a transmission size associated with the feedback signaling; and
    when it is determined that the feedback signaling is to be rate-matched:
        determine a transmission size associated with the feedback signaling;
        encode and modulate an indication of the transmission size, wherein the indication of transmission size is encoded and/or modulated separately from the feedback signaling; and
        transmit the encoded and modulated feedback signaling together with the encoded and modulated indication of the transmission size, in the feedback resource range.

7. A radio node for a radio access network, the radio node comprising radio circuitry and processing circuitry configured to:
    determine the following for feedback signaling to be transmitted by a second radio node:
        a feedback resource range, and whether the feedback signaling is to be rate matched by the second radio node; and
    receive the feedback signaling in the feedback resource range;
    decode and demodulate the received feedback signaling, wherein:
        when it is determined that the feedback signaling is to be rate-matched, the feedback signaling is received in the feedback resource range together with an indication of a transmission size associated with the feedback signaling, and the indication of the transmission size is decoded and/or demodulated by the radio node separately from the feedback signaling; and
        when it is determined that the feedback signaling is not to be rate-matched, the feedback signaling is received in the feedback resource range without an indication of a transmission size associated with the feedback signaling.

8. The radio node of claim 7, wherein the radio circuitry and the processing circuitry are further configured to, when it is determined that the feedback signaling is to be rate-matched, decode and/or demodulate the feedback signaling based on the indication of the transmission size associated with the feedback signaling.

\* \* \* \* \*

UNITED STATES PATENT AND TRADEMARK OFFICE
CERTIFICATE OF CORRECTION

| | | |
|---|---|---|
| PATENT NO. | : 11,496,270 B2 | Page 1 of 1 |
| APPLICATION NO. | : 16/614500 | |
| DATED | : November 8, 2022 | |
| INVENTOR(S) | : Guthmann et al. | |

It is certified that error appears in the above-identified patent and that said Letters Patent is hereby corrected as shown below:

In the Specification

In Column 1, Line 40, delete "5th" and insert -- $5^{th}$ --, therefor.

In Column 9, Line 60, delete "ACK or 485" and insert -- ACK or --, therefor.

Signed and Sealed this
Fourteenth Day of November, 2023

Katherine Kelly Vidal
*Director of the United States Patent and Trademark Office*